Feb. 8, 1966   B. T. LINDSEY ET AL   3,233,917
TRAILER HITCH
Filed July 29, 1963   2 Sheets-Sheet 2
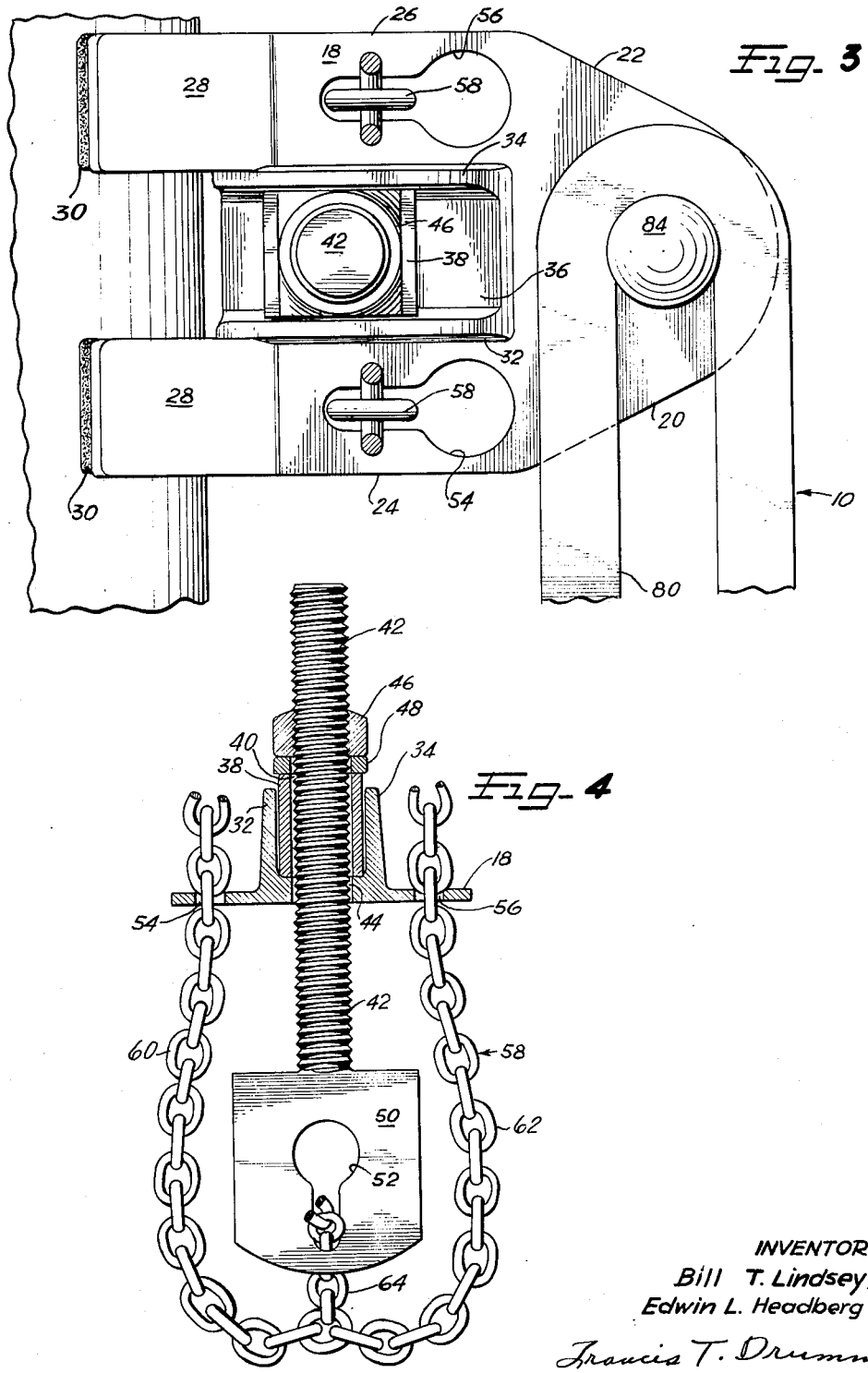
INVENTORS:
Bill T. Lindsey,
Edwin L. Headberg
Francis T. Drumm
ATTORNEY United States Patent Office 3,233,917
Patented Feb. 8, 1966

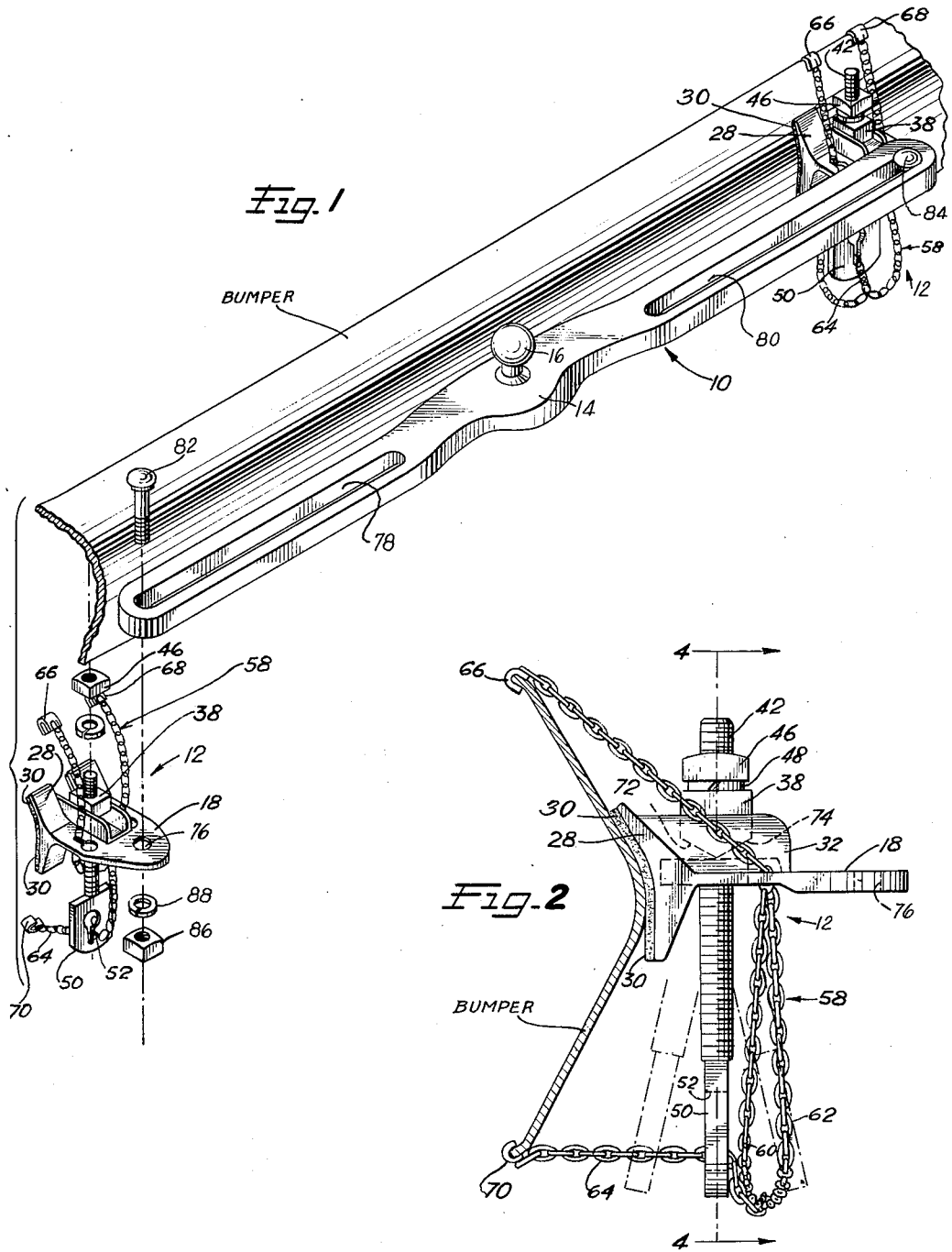

3,233,917
TRAILER HITCH
Bill T. Lindsey, Derby, and Edwin L. Headberg, Wichita, Kans., assignors to Nationwide Trailer Rental System, Inc.
Filed July 29, 1963, Ser. No. 298,252
2 Claims. (Cl. 280—502)

This invention relates to trailer hitches and, more particularly, to a trailer hitch of the bumper type which is characterized by ease and facility of mounting and removal.

Heretofore, trailer hitches have been devised in which a rigid bumper hook, having a plurality of surfaces for bumpers of varying dimensions, was initially brought into engagement with the lower edge of the bumper and in which a plurality of chains were tensioned to force the bumper hook in firm engagement. Trailer hitches of this type were disadvantageous in that their accommodation to a wide variety of bumpers was limited and, furthermore, the rigid nature of the lower bumper hook effects a lack of facility in adjusting the hitch for the most efficient position for use. Accordingly, a principal object of the invention is to devise a trailer hitch of the bumper type which is adapted to accommodate vehicle bumpers of widely varying sizes and configurations and in which a relatively fine degree of flexibility in mounting is afforded.

A further object of the invention is to provide a trailer hitch of the stated type which is characterized by economy of manufacture and which can be mounted on a vehicle bumper quickly without fear of dislodgment while in use.

Another object of the invention is to provide a trailer hitch of a stated character which can be conveniently mounted in the optimum operating position by relatively unskilled help.

These and other objects of the invention will be apparent as the description proceeds, with reference to the acompanying drawings in which:

FIGURE 1 is a view in perspective of a trailer hitch made in accordance with the present invention;

FIGURE 2 is an enlarged elevational sectional view of one of the hitch units forming a part of the trailer hitch of FIGURE 1;

FIGURE 3 is an enlarged top plan view of one of the hitch units of FIGURE 1; and FIGURE 4 is an enlarged sectional elevational view taken substantially on line 4—4 of FIGURE 1.

Referring now to the drawings and, more particularly, to FIGURE 1, the trailer hitch of the present invention is indicated generally by reference numeral 10 and includes a pair of identical hitch units 12 joined by a cross bar 14 on which is mounted at hitch ball 16 to which may be attached a hitching tongue of a trailer.

Each hitch unit 12 includes a substantially flat hitch plate 18 having converging side edges 20 and 22 at one end thereof and parallel edges 24 and 26 at the other end thereof. Affixed to the hitch plate 18, at the left end, as viewed in FIGURES 2 and 3 are a pair of butt brackets 28 of a substantially Y configuration. A resilient pad 30 of rubber or the like is secured by any suitable means to the outer face of each of the brackets 28. The brackets 28 are formed in a manner that bumpers of a wide variety of configurations may be accommodated, as shown clearly in FIGURE 2.

A pair of walls 32 and 34 are secured to a hitch plate 18 in parallel relation each to the other and to the edges 24 and 26. The walls 32 and 34 form a channel 36 in which is received a spacer block 38 having an opening 40 within which is received a screw 42. The screw 42 passes through an opening 44 in the hitch plate 18 and is provided with a nut 46 and a lock washer 48. At the lower end of the screw 42, as viewed in FIGURES 1, 2 and 4 is a base plate 50 having a bayonet slot 52 for a purpose hereafter described.

A pair of bayonet slots 54 and 56 are formed in the hitch plate 18, one at each side of the channel 36.

A chain assembly 58 is provided to secure the hitch unit 12 to a vehicle bumper in a manner hereafter described. The chain assembly is of a generally Y configuration and has arm sections 60 and 62 and a base section 64. The arm sections 60 and 62 pass through the enlarged ends of the bayonet slots 54 and 56 and are provided at the free ends thereof with hooks 66 and 68 which engage the top edge of the vehicle bumper as shown clearly in FIGURES 1 and 2. The base section 64 passes through the bayonet slot 52 and terminates in a hook 70 which engages the lower edge of the vehicle bumper.

To install the hitch unit of the present invention the brackets 28 are brought into abutment with the vehicle bumper and the hooks 66 and 68 are positioned as illustrated in FIGURES 1 and 2. The hitch plate 18 is moved into a substantially horizontal position and the arm sections 60 and 62 of the chain assembly 58 are tautened and twisted so that one of the links passes through the narrow portion of the bayonet slots 54 and 56 respectively. By this arrangement, the hitch plate 18 is suspended by the chain sections 60 and 62 because the next succeeding link in each of the chain sections is perpendicular to the narrow portion of each of the bayonet slots 54 and 56. The chain section 64 is then passed through the bayonet slot 52 and the hook 70 is brought into engagement with the lower edge of the vehicle bumper. In order to exert tension on the chain section 64 it is sometimes necessary to rock the screw 42 as shown in dot and dash lines in FIGURE 2. To this end the bottom of the spacer block 38 is formed with a pair of angularly extending converging surfaces 72 and 74, as shown best in FIGURE 2. When the chain 64 is taut it is then twisted so that one of the links is received in the narrow portion of the bayonet slot 52 and the nut 46 is tightened to draw the screw 42 upwardly for firmly locking the entire unit in place.

The hitch plate 18 of each unit 12 is formed at the tapered end with an opening 76. The cross bar 14 is formed with a pair of elongated slots 78 and 80 for reception of bolts 82 and 84, respectively. The bolt 82 passes through the opening 76 and is provided with a nut 86 and a lock washer 88. By means of the slots 78 and 80 the units 12 may be spaced along the vehicle bumper as required.

The bumper hitch of the present invention exhibits important advantages over bumper hitches heretofore known. For example, the present bumper hitch is readily adaptable to vehicle bumpers of widely varying configurations and sizes. The bumper hitch of the invention may be secured firmly in operative position by a relatively unskilled worker with the aid of only a simple wrench.

It will be appreciated that the above described embodiments of the invention are merely illustrative and are not in any way to be considered to be limiting. Applicant intends to be bound only by the scope of the appended claims.

We claim as our invention:

1. A trailer hitch unit comprising a hitch plate, a pair of bifurcated butt brackets affixed to one end of said hitch plate and adapted to engage a vehicle bumper, a pair of bayonet slots formed in said hitch plate, each of said bayonet slots having a narrow portion extending towards one of said butt brackets, an opening in said hitch plate between said butt brackets, a screw element received in said last named opening, said screw element being formed with a base plate and having a bayonet slot formed in said base plate, the bayonet slot in said base plate having a narrow portion adapted to extend downwardly when said hitch is in operative position, a chain assembly for securing said hitch to a vehicle bumper, said chain assembly being of Y configuration and having a pair of arm sections each received in a bayonet slot of said hitch plate and each having a hook at the free end thereof, said hook being adapted to engage the top edge of the vehicle bumper, said chain assembly arms being received in the narrow portions of the bayonet slots of said hitch plate to maintain said hitch plate in a substantially horizontal position when in use, said chain assembly including a base section receivable in the bayonet slot of the base plate of said screw element and terminating in a hook adapted to engage the lower edge of a vehicle bumper, said screw element being operative upon actuation to engage one of the links of the base section of the chain assembly to tension said base section and urge said butt brackets into firm engagement with the vehicle bumper.

2. A trailer hitch comprising a pair of hitch units adapted to be mounted in spaced relation on a vehicle bumper, a cross bar joining said hitch units, a hitch ball mounted on said cross bar intermediate the ends thereof, each of said hitch units comprising a hitch plate having at one end thereof an opening for reception of a bolt securing said cross bar in operative position, each of said hitch units having at the other end thereof a bifurcated butt bracket adapted to engage a vehicle bumper, a pair of bayonet slots formed in said hitch plate, said hitch plate having adjacent the other end thereof an opening for reception of an elongated screw element, said screw element having a base plate provided with a bayonet slot, a chain assembly of substantially Y configuration for securing said hitch plate in operative position, said chain assembly having arm sections received in the bayonet slots of said hitch plate and terminating in hooks adapted to engage the top edge of a vehicle bumper, said arm sections comprising a plurality of connected links adapted to be selectively arranged in the bayonet slots of said hitch plate to position said hitch plate substantially horizontally, said chain assembly including a base section extending through the bayonet slot of the base plate of said screw and terminating in a hook adapted to engage the lower edge of a vehicle bumper, a nut threadedly received on said screw element and adapted to be turned for upward movement of said screw element to effect tightening of the base section of said chain assembly, whereby each hitch unit may be effectively secured in proper operating position regardless of the bumper configuration or height.

References Cited by the Examiner

UNITED STATES PATENTS

| | | | |
|---|---|---|---|
| 2,472,325 | 6/1949 | Williams | 280—502 |
| 2,791,445 | 5/1957 | Wanamaker | 280—502 |
| 2,814,506 | 11/1957 | Croft | 280—502 |
| 2,938,739 | 5/1960 | Puccio | 280—502 |
| 3,113,789 | 12/1963 | Safford | 280—502 |

BENJAMIN HERSH, *Primary Examiner.*

A. HARRY LEVY, *Examiner.*